United States Patent
Mankin et al.

(10) Patent No.: US 9,489,514 B2
(45) Date of Patent: Nov. 8, 2016

(54) CLASSIFYING MALWARE BY ORDER OF NETWORK BEHAVIOR ARTIFACTS

(71) Applicant: VERISIGN, INC., Reston, VA (US)

(72) Inventors: Allison Mankin, Bethesda, MD (US); Abedelaziz Mohaisen, Chantilly, VA (US); Trevor Tonn, McLean, VA (US)

(73) Assignee: VERISIGN, INC., Reston, VA (US)

( * ) Notice: Subject to any disclaimer, the term of this patent is extended or adjusted under 35 U.S.C. 154(b) by 103 days.

(21) Appl. No.: 14/507,330

(22) Filed: Oct. 6, 2014

(65) Prior Publication Data

US 2015/0106931 A1    Apr. 16, 2015

Related U.S. Application Data (60) Provisional application No. 61/889,889, filed on Oct. 11, 2013.

(51) Int. Cl.
*G06F 12/14* (2006.01)
*G06F 21/56* (2013.01)
*H04L 29/06* (2006.01)

(52) U.S. Cl.
CPC .......... *G06F 21/562* (2013.01); *H04L 63/145* (2013.01); *H04L 63/1408* (2013.01)

(58) Field of Classification Search
CPC .... G06F 21/562; G06F 21/55; G06F 21/552; G06F 21/554; G06F 21/56; G06F 21/563; G06F 21/564; H04L 63/145; H04L 12/2602; H04L 43/00; H04L 43/0876; H04L 63/0218; H04L 63/0245; H04L 63/0263
USPC ........................................................ 726/23
See application file for complete search history.

(56) References Cited

U.S. PATENT DOCUMENTS

| | | | |
|---|---|---|---|
| 7,809,670 B2* | 10/2010 | Lee ...................... | G06F 21/564 706/59 |
| 7,941,853 B2 | 5/2011 | Rozenberg et al. | |
| 8,087,061 B2 | 12/2011 | Jarrett | |
| 8,161,548 B1 | 4/2012 | Wan | |
| 8,161,552 B1 | 4/2012 | Sun et al. | |
| 8,401,982 B1* | 3/2013 | Satish .................. | G06F 21/566 706/12 |
| 8,516,584 B2 | 8/2013 | Moskovitch et al. | |
| 8,745,760 B2* | 6/2014 | Poulson ................ | G06F 21/51 707/999.1 |
| 8,756,693 B2 | 6/2014 | Dube et al. | |

(Continued)

FOREIGN PATENT DOCUMENTS

| | | |
|---|---|---|
| EP | 1814055 A2 | 8/2007 |
| WO | 2011/018271 A1 | 2/2011 |

OTHER PUBLICATIONS

Konrad Rieck et al., "Automatic Analysis of Malware Behavior Using Machine Learning", Journal of Computer Security, vol. 19, No. 4, 2011, pp. 1-30.

(Continued)

*Primary Examiner* — Kambiz Zand
*Assistant Examiner* — Abiy Getachew
(74) *Attorney, Agent, or Firm* — Artegis Law Group, LLP (57) ABSTRACT

The present invention generally relates to systems and methods for classifying executable files as likely malware or likely benign. The techniques utilize temporally-ordered network behavioral artifacts together with machine learning techniques to perform the classification. Because they rely on network behavioral artifacts, the disclosed techniques may be applied to executable files with obfuscated code.

20 Claims, 4 Drawing Sheets

(56) References Cited

U.S. PATENT DOCUMENTS

| | | |
|---|---|---|
| 2009/0013405 A1 | 1/2009 | Schipka |
| 2012/0311708 A1 | 12/2012 | Agarwal et al. |
| 2012/0317644 A1 | 12/2012 | Kumar et al. |
| 2013/0097706 A1 | 4/2013 | Titonis et al. |
| 2013/0111547 A1 | 5/2013 | Kraemer |
| 2013/0198841 A1 | 8/2013 | Poulson |
| 2013/0247192 A1 | 9/2013 | Krasser et al. |
| 2014/0047544 A1 | 2/2014 | Jakobsson |
| 2014/0090061 A1 | 3/2014 | Avasarala et al. |
| 2014/0187177 A1 | 7/2014 | Sridhara et al. |

OTHER PUBLICATIONS

J. Zico Kolter et al., "Learning to Detect and Classify Malicious Executables in the Wild", Journal of Machine Learning Research, vol. 7, 2006, pp. 2721-2744.

Extended European Search Report dated Feb. 12, 2015, European Application No. 14188553.3, pp. 1-12.

* cited by examiner

CLASSIFYING MALWARE BY ORDER OF NETWORK BEHAVIOR ARTIFACTS

CROSS-REFERENCE TO RELATED APPLICATION

The present application claims priority to and the benefit of U.S. Provisional Application No. 61/889,889 entitled "CLASSIFYING MALWARE BY ORDER OF BEHAVIOR ARTIFACTS" filed Oct. 11, 2013, the entirety of which is hereby incorporated by reference.

FIELD OF THE INVENTION

This invention relates generally to identifying whether computer code is malware.

BACKGROUND OF THE INVENTION

Using runtime execution file system and registry artifacts to identify whether code is malware is highly computationally expensive. Moreover, this type of analysis may be effectively circumvented by subsequent malware authors.

SUMMARY

According to some embodiments, a method of determining whether an executable file is malware by using network behavioral artifacts is presented. The method includes identifying a training corpus comprising plurality of benign executable files and a plurality of malware executable files; associating, by an electronic hardware processor, each of a plurality of network behavioral artifacts with a respective character set; assigning, by an electronic hardware processor, each executable file from the training corpus a respective string of character sets, where each string of character sets represents temporally ordered network behavior artifacts of a respective executable file from the training corpus, such that a plurality of strings of character sets is obtained; obtaining, by an electronic hardware processor, for each of the plurality of strings of character sets and for a fixed n>1, a respective set of contiguous substrings of length n; ordering, by an electronic hardware processor, a union of the respective sets of contiguous substrings of length n, such that an ordered universe of contiguous substrings of length n is obtained; forming, for each executable file from the training corpus and by an electronic hardware processor, a respective feature vector, where each respective feature vector comprises a tally list of contiguous substrings of length n in the respective set of contiguous n-grams for the respective executable file from the training corpus, such that a plurality of feature vectors is obtained; classifying, by an electronic hardware processor, each respective feature vector of the plurality of feature vectors as associated with either a benign executable file or a malware executable file from the training corpus, such that a set of classified feature vectors is obtained; training a machine learning system with the set of classified feature vectors, where the machine learning system comprises an electronic hardware processor; identifying an unknown executable file; generating, by an electronic hardware processor, a feature vector for the unknown executable file; submitting the feature vector for the unknown executable file to the machine learning system; obtaining, by an electronic hardware processor, a classification of the unknown executable file as one of likely benign and likely malware; and outputting, by an electronic hardware processor, the classification of the unknown executable file.

Various optional features of the above embodiments include the following. The plurality of network behavioral artifacts can include artifacts of the following types: traffic direction type, protocol type, port number type, size type, domain name system (DNS) record type, and hypertext transfer protocol (HTTP) method type. The traffic direction type can include an inbound traffic artifact and an outbound traffic artifact; the protocol type can include a user datagram protocol (UDP) artifact and a transmission control protocol (TCP) artifact; the port number type can include a port 53 artifact, a port 80 artifact, a port 442 artifact, a port 8080 artifact, and a port 8000 artifact; the size type can include a first quartile artifact, a second quartile artifact, a third quartile artifact and a fourth quartile artifact; the DNS record type can include an A record artifact, an MX record artifact, and an SDA record artifact; and the HTTP method type a GET method artifact, a POST record artifact, and a HEAD record artifact. The assigning can include executing a respective executable file from the training corpus in a virtualized environment. The assigning can include observing network traffic. The machine learning system can include at least one of: a support vector machine, a decision tree, and a k-nearest-neighbor classifier. The outputting can include at least one of: displaying, storing in persistent storage, and providing to a software module. The generating the feature vector for the unknown executable file can include executing the unknown executable file in a virtualized environment. The generating the feature vector for the unknown executable file can include observing network traffic of the unknown executable file. The obtaining a classification of the unknown executable file as one of likely benign and likely malware can include obtaining a classification of the unknown executable file as likely malware, and the method can further include blocking network traffic from an entity associated with the unknown executable file.

According to some embodiments, a system for determining whether an executable file is malware by using network behavioral artifacts is presented. The system includes at least one hardware electronic processor configured to: identify a training corpus comprising plurality of benign executable files and a plurality of malware executable files; associate each of a plurality of network behavioral artifacts with a respective character set; assign each executable file from the training corpus a respective string of character sets, where each string of character sets represents temporally ordered network behavior artifacts of a respective executable file from the training corpus, such that a plurality of strings of character sets is obtained; obtain for each of the plurality of strings of character sets and for a fixed n>1, a respective set of contiguous substrings of length n; order a union of the respective sets of contiguous substrings of length n, such that an ordered universe of contiguous substrings of length n is obtained; form, for each executable file from the training corpus, a respective feature vector, where each respective feature vector comprises a tally list of contiguous substrings of length n in the respective set of contiguous n-grams for the respective executable file from the training corpus, such that a plurality of feature vectors is obtained; classify each respective feature vector of the plurality of feature vectors as associated with either a benign executable file or a malware executable file from the training corpus, such that a set of classified feature vectors is obtained; train machine learning system with the set of classified feature vectors; identify an unknown executable file; generate a feature vector for the unknown executable file; submit the feature vector for the unknown executable file to the machine learning system; obtain a classification of the unknown executable file as one of likely benign and likely malware; and output the classification of the unknown executable file.

Various optional features of the above embodiments include the following. The plurality of network behavioral artifacts can include artifacts of the following types: traffic direction type, protocol type, port number type, size type, domain name system (DNS) record type, and hypertext transfer protocol (HTTP) method type. The traffic direction type can include an inbound traffic artifact and an outbound traffic artifact; the protocol type can include a user datagram protocol (UDP) artifact and a transmission control protocol (TCP) artifact; the port number type can include a port 53 artifact, a port 80 artifact, a port 442 artifact, a port 8080 artifact, and a port 8000 artifact; the size type can include a first quartile artifact, a second quartile artifact, a third quartile artifact and a fourth quartile artifact; the DNS record type can include an A record artifact, an MX record artifact, and an SDA record artifact; and the HTTP method type a GET method artifact, a POST record artifact, and a HEAD record artifact. The at least one hardware electronic processor can be further configured to assign each executable file from the training corpus a respective string of character sets by executing a respective executable file from the training corpus in a virtualized environment. The at least one hardware electronic processor can be further configured to assign each executable file from the training corpus a respective string of character sets by observing network traffic. The machine learning system can include at least one of: a support vector machine, a decision tree, and a k-nearest-neighbor classifier. The at least one processor configured to output can be further configured to at least one of: display, storing in persistent storage, and provide to a software module. The at least one processor configured to generate the feature vector for the unknown executable file can be further configured to execute the unknown executable file in a virtualized environment. The at least one processor configured to generate the feature vector for the unknown executable file can be further configured to observe network traffic of the unknown executable file. The at least one processor configured to obtain a classification of the unknown executable file as one of likely benign and likely malware can be further configured to block network traffic from an entity associated with the unknown executable file upon a classification as likely malware.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments detect malware by considering the order in which high-level network behavior events take place. Individual events are mapped onto an alphabet of character sets, and execution traces are captured via terse concatenations of those letters. Leveraging a corpus of malware, classification techniques are applied to produce a classifier capable of predicting whether an executable file is malware or benign.

Figure 1:
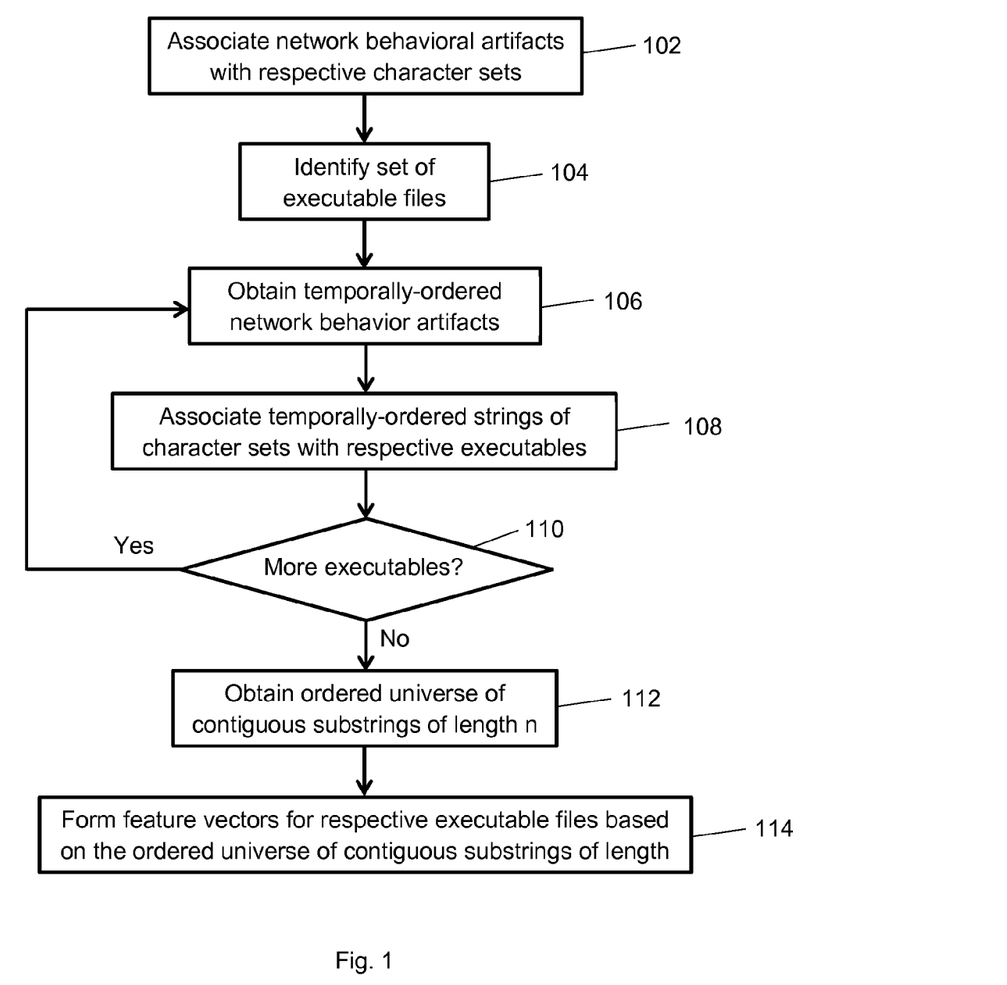
FIG. 1 is a flowchart illustrating a method of generating feature vectors for each of a set of executable files according to some embodiments.

FIG. 1 is a flowchart illustrating a method of generating feature vectors for each of a set of executable files according to some embodiments. The method of FIG. 1 may be included as part of the methods of FIGS. 2 and 3, and may be implemented using the system described in reference to FIG. 4.

At block 102, the method associates each of a set of network behavior artifacts with respective character sets. As used herein, a "character set" is a collection of one or more characters. For example, the following items within quotes are character sets: "A", "AA", "AB", "A1", "AB2", "outbound_traffic", "DNS record of type A", etc. A character set need not be a set of ASCII characters; other data types are embraced.

The Table below depicts example behavior artifacts, together with example associated character sets.

TABLE

| Behavior Artifact | Character Set |
|---|---|
| outbound traffic | A0 |
| inbound traffic | A1 |
| UDP | B0 |
| TCP | B1 |
| other protocols | B2 |
| port 53 | C0 |
| port 80 | C1 |
| port 442 | C2 |
| port 8080 | C3 |
| port 8000 | C4 |
| other ports | C5 |
| outbound size in quartile 1 | D0 |
| outbound size in quartile 2 | D1 |
| outbound size in quartile 3 | D2 |
| outbound size in quartile 4 | D3 |
| inbound size in quartile 1 | D4 |
| inbound size in quartile 2 | D5 |
| inbound size in quartile 3 | D6 |
| inbound size in quartile 4 | D7 |
| DNS record of type A | E0 |
| DNS record of type MX | E1 |
| DNS record of type SDA | E2 |
| DNS record of type CNAME | E3 |
| DNS record of type others | E4 |
| HTTP GET | E5 |
| HTTP POST | E6 |
| HTTP HEAD | E7 |

Note that the behavior artifacts are grouped into subsets of similar types. Example groups include: traffic direction type, protocol type, port number type, size type, domain name system (DNS) record type, and hypertext transfer protocol (HTTP) method type. Thus, network behavior artifacts whose associated character sets begin with the same letter may be grouped together.

Network artifact examples in the Table where the associated character set begins with the character "D" reflect the size of the associated payloads. More particularly, the quartiles are determined relative to the totality of payloads sent (respectively, received) by the same executable over the duration of its execution in a sandbox, as described below in reference to block 106.

At block 104, the method identifies a set of executable files. The identification may be accomplished in any of several ways. As one example, the identification may be accomplished by acquiring and electronically storing copies of the executable files. As another example, the identification may be accomplished by identifying the executable files by name, e.g., the names of the respective files. In the latter such embodiments, the operator of the method need not acquire copies of the executable files; rather, it may be sufficient to observe network traffic generated by the executable files upon execution. The above examples may be combined. That is, some embodiments may identify executables both by acquisition and by observing network traffic associated with a file name, for example.

By way of example, which is continued throughout the description of FIG. 1, block 104 may be sufficiently accomplished by acquiring via file transfer protocol (FTP) a collection of three executable files, including one named "money.exe", and storing the files in persistent memory. Note that typically, many more executable files are used in actual implementations, e.g., on the order of dozens, hundreds, or thousands.

At block 106, the method obtains temporally-ordered network behavior artifacts for the respective executable files in the set of executable files identified at block 104. The method may obtain such artifacts over a suitable test time interval, e.g., by way of non-limiting example, one hour. To accomplish this, the executables may be executed in a controlled environment, or "sandbox". Such a sandbox may include a virtualized environment that appears to the executable to be an ordinary operating system. The sandbox, however, may restrict or prevent communications originating from within the sandbox from leaving the sandbox, and restrict or prevent communications origination from outside the sandbox from entering the sandbox. In some implementations, the sandbox simulates communications that would otherwise originate from outside the sandbox. Moreover, the sandbox may automatically record network behavior event details in which the respective executables are involved. In some embodiments, the sandbox records a timestamp for every network behavior event, as well as the size of any payload.

Continuing the example initiated at the description of block 104, the file "money.exe" may be executed in a sandbox environment. The sandbox may, for example, record that the executable produces two network behavior events over the duration of the test interval, namely, a DNS query for a mailserver (MX) on port 53 followed by an incoming UDP communication on port 80. The first network behavior event includes three network artifacts, namely, "outbound traffic", "port 53", and "DNS record of type MX". (For ease of exposition, network artifacts from the above Table whose associated character sets begin with "D", i.e., those network behavior artifacts that indicate payload size, are omitted in the ongoing description of the present example.)

Note also that, as is the case here, a single network behavior event may give rise to multiple network behavior artifacts. In such instances, the order of the artifacts may be set lexicographically according to the associated character sets, for example.

Continuing the example, because three network behavior artifacts arose from a single network behavior event, they are ordered lexicographically according to their associated character sets, namely, ("outbound traffic", "port53", and "DNS record of type MX"). The second example network behavior event, an incoming communication on port 80, has two associated network behavior artifacts. Properly ordered, they are ("incoming traffic", "port 80"). Thus, the temporally-ordered network behavior artifacts for this example are ("outbound traffic", "port 53", and "DNS record of type MX", "incoming traffic", "port 80").

At block 108, the method associates a temporally-ordered string of character sets with the observed network behavior artifacts. This process may include substitution of character sets for discursive descriptions. Continuing the ongoing example, an associated ordered string of character sets for money.exe in light of the Table may be (A0, C0, E1, A2, B0).

At block 110, the method determines whether there are additional executable files from the set of executable files identified at block 104 for which temporally-ordered network behavior artifacts have not yet been determined. If so, then the process returns to block 106, and blocks 106 and 108 are performed for an additional respective executable file. Otherwise, the process branches to block 112.

Note that although the description in FIG. 1 appears to depict performing the actions of blocks 106 and 108 sequentially, one executable at a time, embodiments are not so limited. Embodiments may perform these operations in parallel, for multiple executables at once. Some embodiments may perform the operations of blocks 106 and 108 partially in parallel, and partially sequentially, e.g., in batches.

At block 112, the method obtains an ordered universe of contiguous substrings of length n for some fixed n. The actions of block 112 may be performed once blocks 102-108 are performed for all executable files under consideration. In some implementations, for example, block 112 may be performed once blocks 102-110 are performed for each executable in a training corpus of executable files, discussed further below in reference to FIG. 2.

The ordered universe of contiguous substrings of length n may be obtained as follows. To start, a value for n is fixed. Suitable values for n include, by way of non-limiting example, 2, 3, 4, 5 or 6. Next, each temporally-ordered string of character sets associated with an executable identified at block 104 is parsed to obtain its full set of contiguous substrings of length n. Non-contiguous substrings, i.e., substrings that omit internal character sets, are not considered. The contiguous substrings are merged and duplicates are removed, i.e., a union is formed. Finally, the resulting set is ordered in a coherent fashion, e.g., lexicographically. The product of these operations is an example of an ordered universe of contiguous substrings of length n.

Continuing the ongoing example, suppose the following temporally-ordered strings of character sets have been obtained from applying blocks 102-110 to the three executable files of the example, including the executable file money.exe: (A0, C0, E0), (A0, C0, E1), and (A0, C0, E1, A2, B0), the latter string arising from money.exe. For n=3, the universe of contiguous substrings of length 3 taken from these strings is as follows: {(A0, C0, E0), (A0, C0, E1), (C0, E1, A2), (E1, A2, B0)}. Each triple in the preceding list occurs in a contiguous fashion in at least one of the temporally-ordered strings of character sets associated with the three executable under consideration in this example. Finally, ordering the universe of contiguous substrings of length 3 lexicographically, by way of non-limiting example, yields {(A0, C0, E0), (A0, C0, E1), (C0, E1, A2), (E1, A2, B0)}; thus, the order is unchanged.

Alternatively, the ongoing example may be continued with n=2 instead of n=3. The corresponding universe of contiguous substrings of length 2 is as follows: {(A0, C0), (C0, E0), (C0, A1), (C0, E1), (E1, A2), (A2, B0)}. Ordering this list lexicographically yields the following ordered universe of contiguous substrings of length 2: {(A0, C0), (A2, B0), (C0, A1), (C0, E0), (C0, E1), (E1, A2)}.

At block 114, the method forms feature vectors for the respective executable files identified at block 104 based on the ordered universe of contiguous substrings of length n, keeping n fixed. For an individual executable file, this may be accomplished by tallying the number of contiguous substrings of length n that appear in the associated ordered string of character sets. More particularly, for a fixed n and an individual executable file, an associated feature vector may be formed, starting with the ordered universe of contiguous substrings of length n, and replacing each entry with a tally of the number of times the respective substring appears in the ordered string of character sets for the executable file.

Continuing the example, for n=3, the ordered universe of contiguous substrings of length 3 is, as described above, {(A0, C0, E0), (A0, C0, E1), (C0, E1, A2), (E1, A2, B0)}, and the ordered string of character sets associated with the executable file money.exe is (A0, C0, E1, A2, B0). The associated feature vector for money.exe and n=3 is accordingly (0, 1, 1, 1) because (A0, C0, E0) does not appear in the ordered string of character sets associated with money.exe, and the remaining triples from the ordered universe of contiguous substrings of length 3 each appear once.

Continuing the example for n=2, the ordered universe of contiguous substrings of length 2 is {(A0, C0), (A2, B0), (C0, A1), (C0, E0), (C0, E1), (E1, A2)}. For the ordered string of character sets associated with money.exe, namely (A0, C0, E1, A2, B0), the corresponding feature vector is {1, 1, 0, 0, 1, 1}. This is because neither (C0, A1) nor (C0, E0) appear in the ordered string of character sets for money.exe, but the other pairs in the ordered universe of contiguous substrings of length 2 each appear once.

Note that limiting the ordered universe of contiguous substrings to those that are actually detected reduces the domain of discourse substantially in comparison to the entire set of all possible strings. This results in faster performance and requires substantially less memory.

Figure 2:
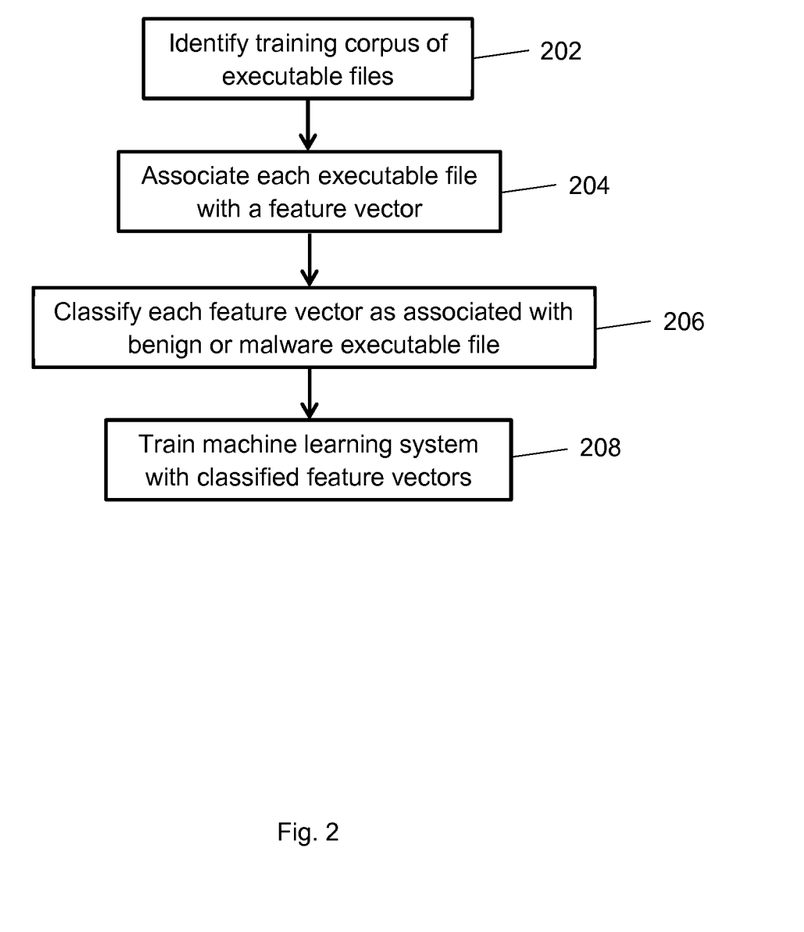
FIG. 2 is a flowchart depicting a method of training a machine learning system according to some embodiments.
Figure 3:
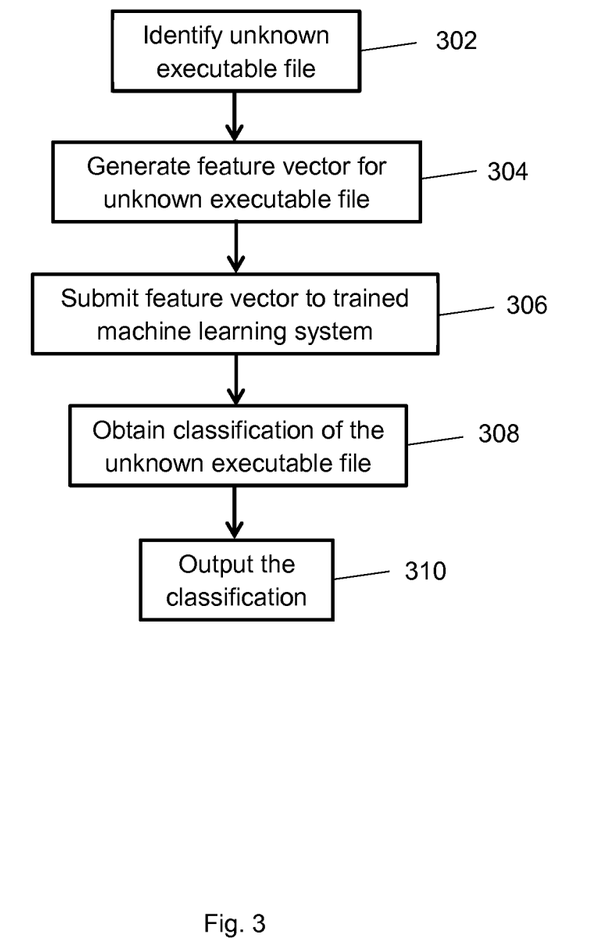
FIG. 3 is a flowchart depicting a method of classifying an executable file according to some embodiments.

The feature vectors formed according to the process of FIG. 1 may be output to persistent memory to be used in either of the processes described in reference to FIGS. 2 and 3.

FIG. 2 is a flowchart depicting a method of training a machine learning system according to some embodiments. The method of FIG. 2 may incorporate the method described in reference to FIG. 1 above, and may be performed using the system described in reference to FIG. 4 below.

At block 202, the method identifies a training corpus of executable files. The files may be identified in the manner described above in reference to block 104 of FIG. 1. In general, the executable files are classified as either malware or benign. The classification may be obtained at the time the files are obtained, or at a later time. The classification may be performed by one or more analysts trained in the detection and identification of malware.

At block 204, the method associates each executable file from those identified at block 202 above with a feature vector. This may be accomplished as described above in reference to FIG. 1, with the training corpus of executable files used as the "set of executable files" referred to at block 104. The resulting setoff feature vectors may be stored in persistent and/or volatile memory.

At block 206, the method classifies each feature vector as associated with either a benign or a malware executable file. In general, the actions of this block may be performed by grouping each feature vector into one of two sets, each representing malware of benign executables. Alternately, or in addition, each feature vector may be modified by adding a classification field configured to retain a bit value, with, for example, 1 representing malware and 0 representing benign.

At block 208, the method trains a machine learning system with the classified feature vectors. Various machine learning techniques may be used, including, by way of non-limiting example, support vector machines, decision trees, and k-nearest-neighbor classifiers. The exact techniques for training vary, depending on the machine learning technique used. Nevertheless, conventional techniques may be used.

A result of block 208 is a properly trained machine learning technique that is ready to classify unknown executables.

FIG. 3 is a flowchart depicting a method of classifying an executable file according to some embodiments. The method of FIG. 3 may incorporate the techniques described above in reference to FIG. 1, and may utilize a trained machine learning technique as described above in reference to FIG. 2. Further, the method of FIG. 3 may be performed using the system described below in reference to FIG. 4.

At block 302, the method identifies an unknown executable file. The identification may be performed in the manner described above in reference to block 104 of FIG. 1.

At block 304, the method generates a feature vector for the unknown executable file. The actions of this block may be performed as discussed above in reference to FIG. 1. More particularly, the actions of this block may use the ordered universe of contiguous substrings of length n of FIG. 2 to form the feature vector.

At block 306, the method submits the feature vector to a trained machine learning technique, e.g., the trained learning machine described above in reference to FIG. 2. The trained machine learning technique processes the feature vector in a manner specific to the particular trained machine learning technique.

At block 308, the method obtains a classification of the unknown executable file from the trained machine learning technique. Recognizing that such techniques may not be unfailingly accurate, the classification may be as one of "likely malware" and "likely benign". The classification may include an electronic datum produced by the trained machine learning technique.

At block 310, the technique outputs the classification. The output may be in the form of a display by a computer monitor, for example. In some embodiments, the output is to a software module or persistent storage. In some embodiments, the output to a software module initiates the software module to block at least some network traffic associated with copies of the executable.

Figure 4:
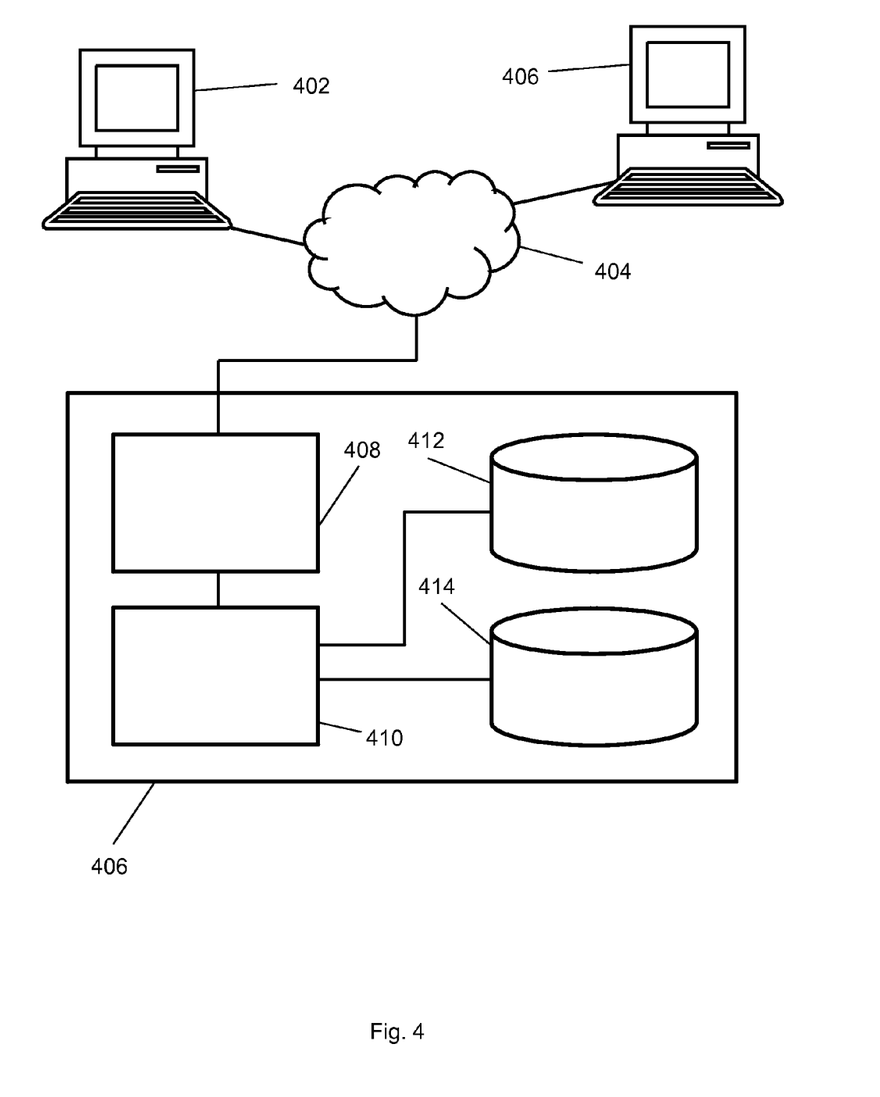
FIG. 4 is a schematic diagram of a system according to some embodiments.

FIG. 4 is a schematic diagram of a system according to some embodiments. In particular, FIG. 4 illustrates various hardware, software, and other resources that can be used in implementations of the disclosed embodiments. In embodiments as shown, training and classifying computer 406 can include a processor 410 coupled to a random access memory operating under control of or in conjunction with an operating system. The processor 410 in embodiments can be incorporated in one or more servers, clusters, or other computers or hardware resources, or can be implemented using cloud-based resources. Processor 410 can, in general, be programmed or configured to execute control logic and control training and classification operations.

Processor 410 can communicate with persistent memory, which may store program instructions that configure processor 410 to execute any of the various method disclosed herein. Processor 410 can also communicate with persistent memory 412, such as a database stored on a local hard drive or drive array, to access or store executable files to be or that have been classified, feature vectors, ordered universes of contiguous substrings, or other data.

Processor 410 can further communicate with a network interface 408, such as an Ethernet or wireless data connection, which in turn communicates with one or more networks 404, such as the Internet or other public or private networks. The network interface may be able to monitor network traffic between computers 402 and 406.

Other configurations of the training and classification computer 406, associated network connections, and other hardware, software, and service resources are possible.

Certain embodiments can be performed as a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of determining whether an executable file is malware by using network behavioral artifacts, the method comprising:

identifying a training corpus comprising plurality of benign executable files and a plurality of malware executable files;

associating, by an electronic hardware processor, each of a plurality of network behavioral artifacts with a respective character set;

assigning, by an electronic hardware processor, each executable file from the training corpus a respective string of character sets, wherein each string of character sets represents temporally ordered network behavior artifacts of a respective executable file from the training corpus, whereby a plurality of strings of character sets is obtained;

obtaining, by an electronic hardware processor, for each of the plurality of strings of character sets and for a fixed n>1, a respective set of contiguous substrings of length n;

ordering, by an electronic hardware processor, a union of the respective sets of contiguous substrings of length n, whereby an ordered universe of contiguous substrings of length n is obtained;

forming, for each executable file from the training corpus and by an electronic hardware processor, a respective feature vector, wherein each respective feature vector comprises a tally list comprising counts of contiguous substrings of length n in the respective set of contiguous n-grams for the respective executable file from the training corpus, whereby a plurality of feature vectors is obtained;

classifying, by an electronic hardware processor, each respective feature vector of the plurality of feature vectors as associated with either a benign executable file or a malware executable file from the training corpus, whereby a set of classified feature vectors is obtained;

training a machine learning system with the set of classified feature vectors, wherein the machine learning system comprises an electronic hardware processor;

identifying an unknown executable file;

generating, by an electronic hardware processor, a feature vector for the unknown executable file;

submitting the feature vector for the unknown executable file to the machine learning system;

obtaining, by an electronic hardware processor, a classification of the unknown executable file as one of likely benign and likely malware; and outputting, by an electronic hardware processor, the classification of the unknown executable file.

2. The method of claim 1, wherein the plurality of network behavioral artifacts comprise artifacts of the following types: traffic direction type, protocol type, port number type, size type, domain name system (DNS) record type, and hypertext transfer protocol (HTTP) method type.

3. The method of claim 2, wherein the traffic direction type comprises an inbound traffic artifact and an outbound traffic artifact;

the protocol type comprises a user datagram protocol (UDP) artifact and a transmission control protocol (TCP) artifact;

the port number type comprises a port 53 artifact, a port 80 artifact, a port 442 artifact, a port 8080 artifact, and a port 8000 artifact;

the size type comprises a first quartile artifact, a second quartile artifact, a third quartile artifact and a fourth quartile artifact;

the DNS record type comprises an A record artifact, an MX record artifact, and an SDA record artifact; and the HTTP method type comprises a GET method artifact, a POST record artifact, and a HEAD record artifact.

4. The method of claim 1, wherein the assigning comprises executing a respective executable file from the training corpus in a virtualized environment.

5. The method of claim 1, wherein the assigning comprises observing network traffic.

6. The method of claim 1, wherein the machine learning system comprises at least one of: a support vector machine, a decision tree, and a k-nearest-neighbor classifier.

7. The method of claim 1, wherein the outputting comprises at least one of: displaying, storing in persistent storage, and providing to a software module.

8. The method of claim 1, wherein the generating the feature vector for the unknown executable file comprises executing the unknown executable file in a virtualized environment.

9. The method of claim 1, wherein the generating the feature vector for the unknown executable file comprises observing network traffic of the unknown executable file.

10. The method of claim 1, wherein the obtaining a classification of the unknown executable file as one of likely benign and likely malware comprises obtaining a classification of the unknown executable file as likely malware, the method further comprising blocking network traffic from an entity associated with the unknown executable file.

11. A system for determining whether an executable file is malware by using network behavioral artifacts, the system comprising at least one hardware electronic processor configured to:
identify a training corpus comprising plurality of benign executable files and a plurality of malware executable files;
associate each of a plurality of network behavioral artifacts with a respective character set;
assign each executable file from the training corpus a respective string of character sets, wherein each string of character sets represents temporally ordered network behavior artifacts of a respective executable file from the training corpus, whereby a plurality of strings of character sets is obtained;
obtain for each of the plurality of strings of character sets and for a fixed n>1, a respective set of contiguous substrings of length n;
order a union of the respective sets of contiguous substrings of length n, whereby an ordered universe of contiguous substrings of length n is obtained;
form, for each executable file from the training corpus, a respective feature vector, wherein each respective feature vector comprises a tally list comprising counts of contiguous substrings of length n in the respective set of contiguous n-grams for the respective executable file from the training corpus, whereby a plurality of feature vectors is obtained;
classify each respective feature vector of the plurality of feature vectors as associated with either a benign executable file or a malware executable file from the training corpus, whereby a set of classified feature vectors is obtained;
train machine learning system with the set of classified feature vectors;
identify an unknown executable file;
generate a feature vector for the unknown executable file;
submit the feature vector for the unknown executable file to the machine learning system;
obtain a classification of the unknown executable file as one of likely benign and likely malware; and
output the classification of the unknown executable file.

12. The system of claim 11, wherein the plurality of network behavioral artifacts comprise artifacts of the following types: traffic direction type, protocol type, port number type, size type, domain name system (DNS) record type, and hypertext transfer protocol (HTTP) method type.

13. The system of claim 12, wherein the traffic direction type comprises an inbound traffic artifact and an outbound traffic artifact;
the protocol type comprises a user datagram protocol (UDP) artifact and a transmission control protocol (TCP) artifact;
the port number type comprises a port 53 artifact, a port 80 artifact, a port 442 artifact, a port 8080 artifact, and a port 8000 artifact;
the size type comprises a first quartile artifact, a second quartile artifact, a third quartile artifact and a fourth quartile artifact;
the DNS record type comprises an A record artifact, an MX record artifact, and an SDA record artifact; and
the HTTP method type comprises a GET method artifact, a POST record artifact, and a HEAD record artifact.

14. The system of claim 11, wherein the at least one hardware electronic processor is further configured to assign each executable file from the training corpus a respective string of character sets by executing a respective executable file from the training corpus in a virtualized environment.

15. The system of claim 11, wherein the at least one hardware electronic processor is further configured to assign each executable file from the training corpus a respective string of character sets by observing network traffic.

16. The system of claim 11, wherein the machine learning system comprises at least one of: a support vector machine, a decision tree, and a k-nearest-neighbor classifier.

17. The system of claim 11, wherein the at least one processor configured to output is further configured to at least one of: display, storing in persistent storage, and provide to a software module.

18. The system of claim 11, wherein the at least one processor configured to generate the feature vector for the unknown executable file is further configured to execute the unknown executable file in a virtualized environment.

19. The system of claim 11, wherein the at least one processor configured to generate the feature vector for the unknown executable file is further configured to observe network traffic of the unknown executable file.

20. The system of claim 11, wherein the at least one processor configured to obtain a classification of the unknown executable file as one of likely benign and likely malware is further configured to block network traffic from an entity associated with the unknown executable file upon a classification as likely malware.

* * * * *